US009849406B1

United States Patent
Frolov et al.

(10) Patent No.: US 9,849,406 B1
(45) Date of Patent: Dec. 26, 2017

(54) CRYOGENIC DEVICE FOR SEPARATING GAS FRACTION FROM A LIQUEFIED NATURAL GAS FLOW

(71) Applicant: OPEN JOINT STOCK COMPANY "RUSSIAN RAILWAYS", Moscow (RU)

(72) Inventors: Boris Mikhailovich Frolov, Kolomna (RU); Valeriy Alekseevich Nikonov, Kolomna (RU); Andrei Gennadievich Voronkov, Kolomna (RU); Vladimir Petrovich Bazdnikin, Kolomna (RU); Nikolai Konstantinovich Nikolskiy, Kolomna (RU); Nataliya Viktorovna Skvortsova, Kolomna (RU)

(73) Assignee: OPEN JOINT STOCK COMPANY "RUSSIAN RAILWAYS", Moscow (RU)

( * ) Notice: Subject to any disclaimer, the term of this patent is extended or adjusted under 35 U.S.C. 154(b) by 0 days.

(21) Appl. No.: 15/356,402

(22) Filed: Nov. 18, 2016

(51) Int. Cl.
*B01D 19/00* (2006.01)
*F17C 13/00* (2006.01)

(52) U.S. Cl.
CPC ..... *B01D 19/0042* (2013.01); *B01D 19/0031* (2013.01); *F17C 13/00* (2013.01); *F17C 2265/015* (2013.01); *F17C 2270/01* (2013.01)

(58) Field of Classification Search
None
See application file for complete search history.

(56) References Cited

U.S. PATENT DOCUMENTS

2008/0307789 A1* 12/2008 Mak .................. F25J 3/0219
60/651

FOREIGN PATENT DOCUMENTS

RU     2385756 C1 *   4/2010

OTHER PUBLICATIONS

Translation of RU 2385756 C1, dated Apr. 13, 2017.*

* cited by examiner

*Primary Examiner* — Amber R Orlando
*Assistant Examiner* — Phillip Y Shao
(74) *Attorney, Agent, or Firm* — Andrew W. Chu; Craft Chu PLLC

(57) ABSTRACT

The cryogenic device for separating gas fraction from a liquefied natural gas flow carries out a two-stage separation of a gas fraction. The device includes a cylindrical housing provided with an inlet pipeline and an outlet pipeline, and a perforated partition arranged within the housing so as to face the outlet pipeline. The housing has two (upper and lower) portions of cylindrical shape that are connected to each other at an angle α of 135°-170°. There are two additional pipelines on the outside, one of them being used for pressure feed of a gas fraction after the first separation stage into the housing upper portion, and the other additional pipeline being used for extracting a gas fraction after the second separation stage into the gas cavity of a reservoir containing a cryogenic fuel.

1 Claim, 1 Drawing Sheet

CRYOGENIC DEVICE FOR SEPARATING GAS FRACTION FROM A LIQUEFIED NATURAL GAS FLOW

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This invention relates to devices for separating liquefied natural gas into liquid and gas fractions. It is intended for use e.g., in a gas treatment system for railroad locomotives operating on liquefied natural gas (LNG).

2. Description of Related Art Including Information Disclosed Under 37 CFR 1.97 and 37 CFR 1.98

A gas separator (RU Patent No. 2385756, IPC B01D45/04, publ. Apr. 10, 2010) is known in the art that is intended for separating liquids and mechanical impurities from a gas flow. This separator comprises a housing provided with fittings for entrance of a mixture and for exit of separated phases, and a separation nozzle and a voluminous gas-distribution device made as a perforated wedge body having channels for passage of a mixture to be separated, stripped gas and separated impurities to be extracted, the device being arranged so that a gap exists between it and the housing in front of the fitting for entrance of a mixture to be separated. A disadvantage of this device is its design complexity.

BRIEF SUMMARY OF THE INVENTION

The technical effect of this invention is a simplified structure and improved reliability of a separation device.

This technical effect is achieved due to that the cryogenic device for separating gas fraction from a liquefied natural gas flow, wherein two-stage separation of a gas fraction is carried out, comprises a cylindrical housing provided with an inlet pipeline and an outlet pipeline, and a perforated partition arranged within the housing so as to face the outlet pipeline, the housing being formed by two (upper and lower) portions of cylindrical shape that are connected to each other at an angle $\alpha$ of 135°-170° and being provided with two additional pipelines on the outside, one of them being used for pressure feed of a gas fraction after the first separation stage into the housing upper portion, and the other additional pipeline being used for extracting a gas fraction after the second separation stage into the gas cavity of a reservoir containing a cryogenic fuel.

BRIEF DESCRIPTION OF THE SEVERAL VIEWS OF THE DRAWINGS

The proposed structure is illustrated by the accompanying drawings.

DETAILED DESCRIPTION OF THE INVENTION

Figure 1:
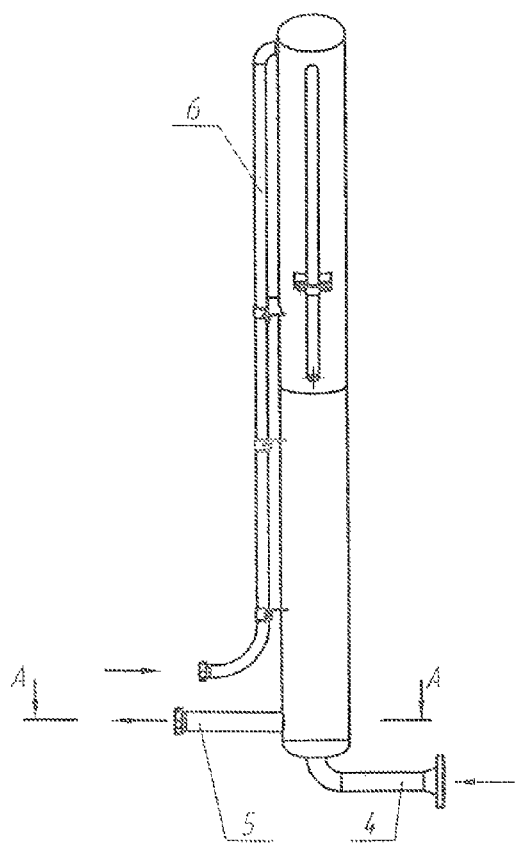
FIG. 1 shows a front elevation view of the cryogenic device for separating gas fraction from a liquefied natural gas flow.
Figure 2:
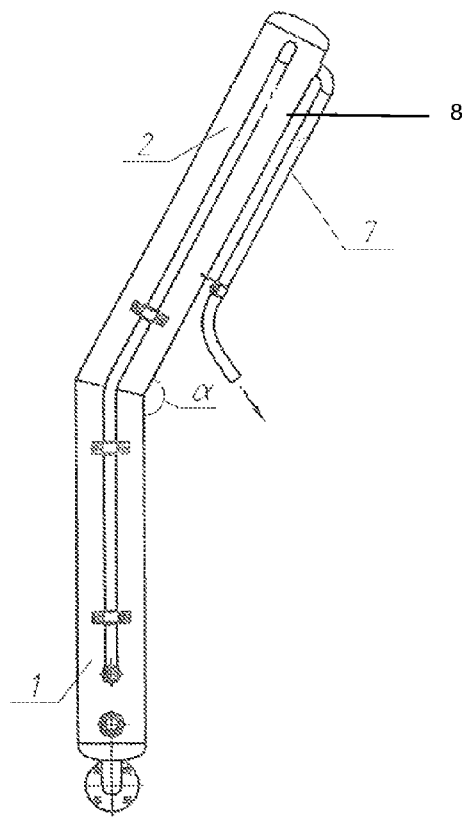
FIG. 2 shows a side elevation view of the cryogenic device for separating gas fraction from a liquefied natural gas flow.
Figure 3:
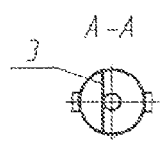
FIG. 3 shows a sectional view along line A-A of FIG. 1.

The cryogenic device for separating gas fraction from a liquefied natural gas flow comprises a housing consisting of two portions of cylindrical shape: a lower portion 1 arranged vertically and an upper portion 2 connected to the lower portion 1 at an angle $\alpha$ of 135°-170°, a perforated partition 3, an inlet pipeline 4, an outlet pipeline 5, an additional inlet pipeline 6, and an additional outlet pipeline 7.

The cryogenic device for separating gas fraction from a liquefied natural gas flow can be operated as follows. Liquefied natural gas is fed from a cryogenic fuel reservoir (not shown in the figures) via the inlet pipeline 4 through the perforated partition 3 into the lower cylindrical portion 1, as arranged vertically, of the housing; thus, the first stage of liquefied natural gas separation into a liquid fraction and a gas fraction is carried out. Then, the liquid fraction is passed into a cryogenic pump (not shown in the figures) via the outlet pipeline 5, from which the liquid fraction after the first separation stage together with remaining gas fraction particles is pressure-fed via the additional inlet pipeline 6 into the upper cylindrical portion 2 of the housing, the upper cylindrical portion being connected to the lower cylindrical portion 1 at an angle $\alpha$ of 135°-170°. When in the upper cylindrical portion 2 of the housing, liquid fraction particles settle onto the inclined wall or surface 8 of the housing; thus, the second separation stage is carried out. After that, the gas fraction is extracted from the upper portion of the device housing via the additional pipeline 7 into the gas cavity of the cryogenic fuel reservoir.

The cryogenic device for separating gas fraction from a liquefied natural gas flow has been tested in the gas treatment system of a GT1h-002 gas-turbine locomotive and proved to be reliable and simple in maintenance.

We claim:

1. A cryogenic device for separating gas fraction from a liquefied natural gas flow in a two-stage separation, the device comprising:
   a cylindrical housing being comprised of a lower portion and an upper portion mounted on top of said lower portion, each portion having a cylindrical shape and being connected to each other at an angle α of 135°-170°, said upper portion having an inclined wall;

an inlet pipeline in fluid connection to said lower portion of the housing;

an outlet pipeline in fluid connection to said lower portion of the housing;

a perforated partition arranged within said lower portion of the housing between said inlet pipeline and said outlet pipeline;

an additional inlet pipeline in fluid connection with said outlet pipeline and said upper portion of the housing; and an additional outlet pipeline in fluid connection with said upper portion.

* * * * *